May 10, 1932.  J. C. JOHNSON  1,857,641
ACOUSTIC DEVICE
Filed June 3, 1931   2 Sheets-Sheet 1
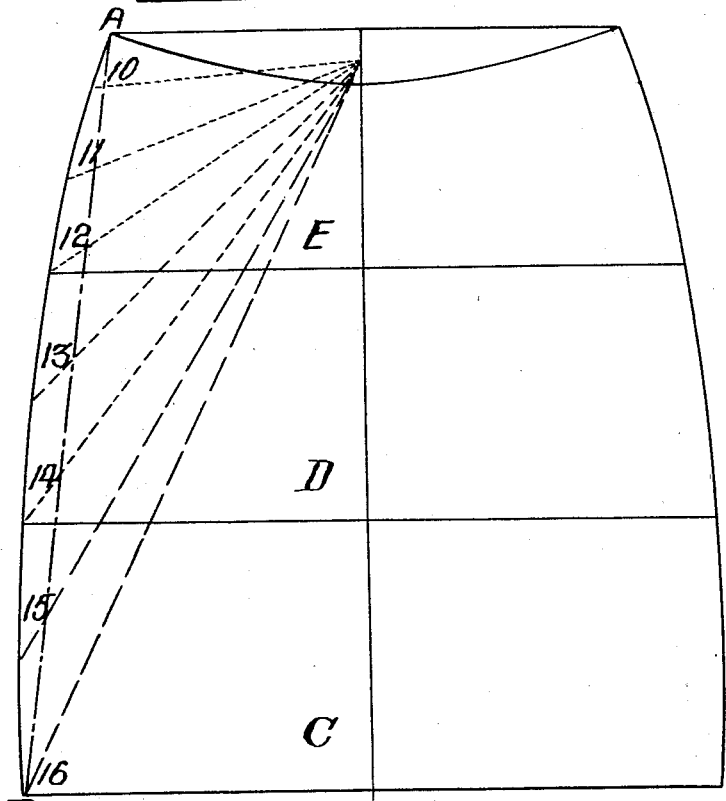
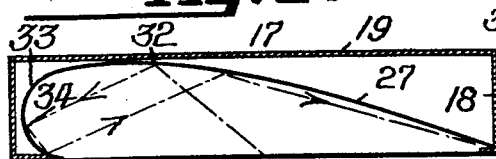
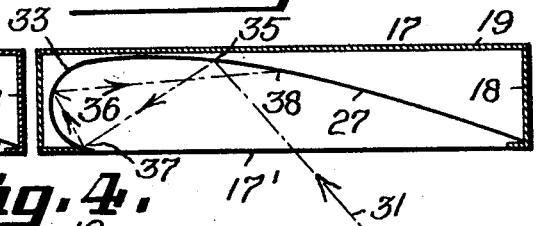
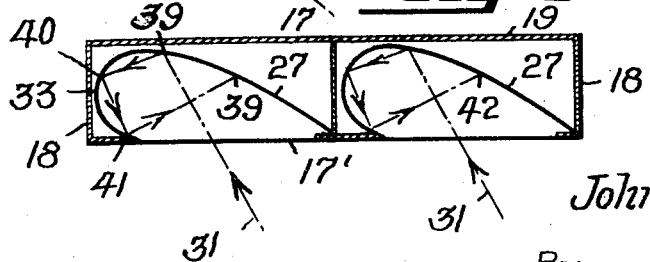
INVENTOR
John Clifford Johnson.
By
ATTORNEY.

May 10, 1932. J. C. JOHNSON 1,857,641
ACOUSTIC DEVICE
Filed June 3, 1931 2 Sheets-Sheet 2
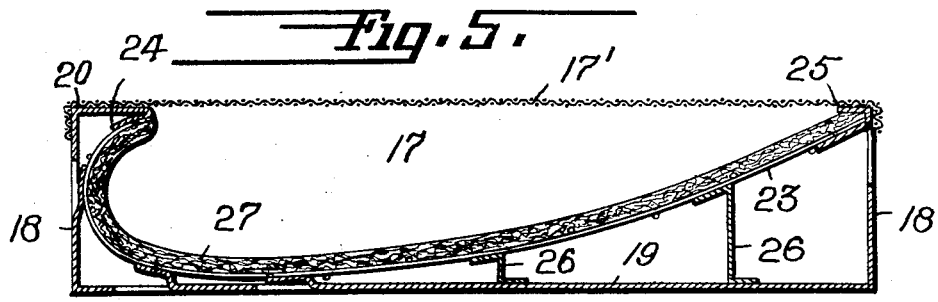
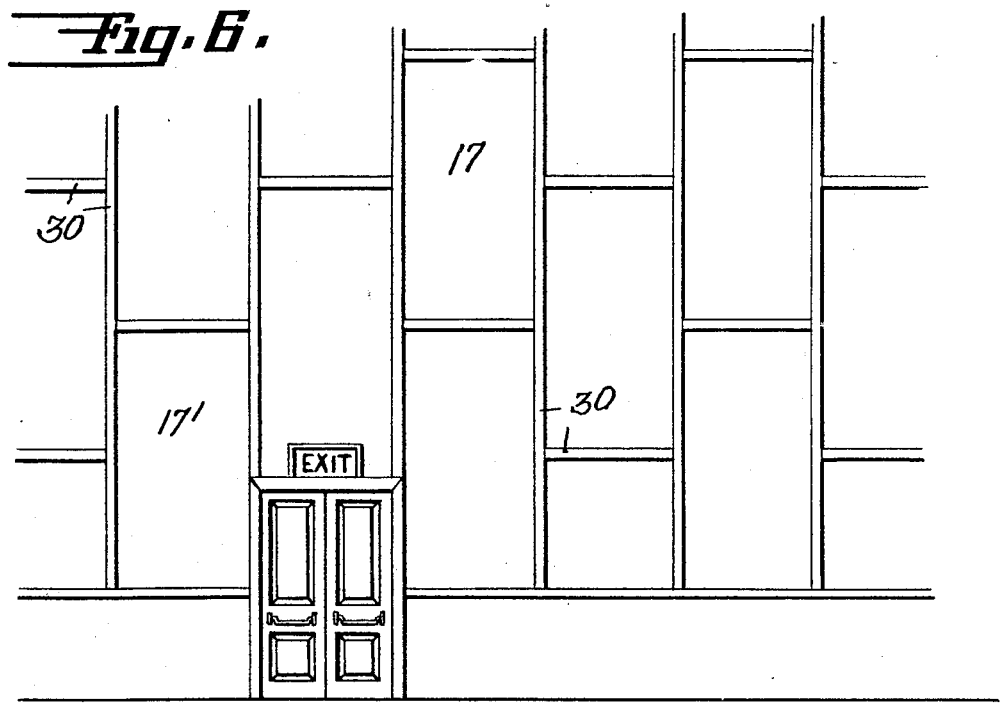
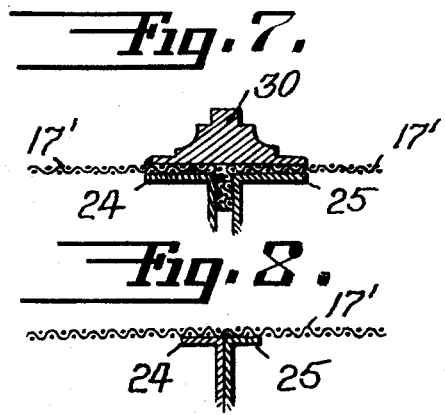
INVENTOR
John Clifford Johnson
ATTORNEY.

Patented May 10, 1932

1,857,641

UNITED STATES PATENT OFFICE

JOHN CLIFFORD JOHNSON, OF GLEN COVE, NEW YORK

ACOUSTIC DEVICE

Application filed June 3, 1931. Serial No. 541,819.

My invention relates to acoustic devices or sound traps, whereby the device pockets or envelops the sound wave and prevents any reflected wave from interfering with any subsequent sound from the same point.

The main object of my invention is to provide a reliable and efficient means for catching and trapping sound waves by having it absorb the major parts of the sound in suitable soft material maintained within the acoustic trap.

Another object is to provide a suitable receptacle of convenient size and depth that may be built one upon the other to any height to cover the walls of a theatre or other place. Within said receptacle will be placed a sheet of pressed felt of suitable thickness, with a reinforced backing of very coarse mesh wire; after which the complete sound trap may be covered with a suitable fine wire mesh or other suitable material that will permit the sound to enter the interior.

Another object is to so divide the auditorium, theatre, church, etc., into described zones for placing sound traps of special designs within each, so that they will catch and hold against reverberation in each of the several zones, and thereby permit the listener to enjoy the sound wave without those distortions by rebounding waves, as is now characteristic.

Still another object is to provide said receptacle with its interior felt-lined sound absorbing material, so arranged that it will cause the sounds to be reflected within itself till the major parts of the same have been absorbed by the material.

A more particular object is to provide a device that will take the place of the plaster, yet be so ornamental as to be decorative in the very highest of architectural degree, yet containing means whereby the sound waves emanating from the main point (which is usually the stage, rostrum or pulpit) will be absorbed and not reflected so as to interrupt or become contaminated with and mar succeeding sounds that may be broadcast from that point.

The invention will be better understood from the following description, taken in connection with the accompanying drawings, wherein is shown what is now considered the preferred form, while the drawings illustrate merely an example of means for putting my invention into practice; its scope will be pointed out in the specification and in the appended claims.

Further objects and advantages will become apparent as the description of the invention is hereinafter developed.

Referring to the drawings, Fig. 1 is a schematic layout of a theatre; Fig. 2 is a schematic horizontal sectional view through one of the acoustic boxes; Fig. 3 is a like view of another of the sound traps; Fig. 4 is another view of pockets for absorbing the sound waves; Fig. 5 is an enlarged view through one of the traps, showing the construction and arrangements of maintaining the curved absorption member therein; Fig. 6 shows an example of the sound traps placed one above the other, arranged in panel formation; Fig. 7 is a detailed view, showing one means for securing the traps together; and Fig. 8 is a view showing the fine wire mesh material spread over the several boxes without being paneled, as shown in Fig. 6, so as to carry out any desired method of interior decoration.

One of the most difficult and yet most important problems in architectural acoustics is that of sound-proofing walls of auditoriums, halls, theatres, and similar rooms where conditions must necessarily be such that speech and music can be transmitted clearly and distinctly to the audience. To overcome these difficulties, I propose not to finish the interior walls of the auditorium with plaster, but rather to divide the wall space into zones, as shown in Fig. 1, and then place within each respective zone a series of rectangular sound traps that are specially designed to cover the entire wall of the particular zone.

As will be seen from Fig. 1 the theatre or auditorium is divided as above noted, and in view of the fact that both sides are alike, only one side will be described. The line A—B indicates the approach line to achieve average angles. The zones E, D and C have been further divided into such subdivisions as will be best suited for the particular sound trap to be used. Zones E and D are divided into three sections each, while zone C is only divided into two sections, each section being designated 10, 11, 12, 13, 14, 15 and 16. Reverberation does not affect the area between A, 10 and 11, on account of the use in these sections in the ordinary theatre of private boxes, provided with more or less curtain drapes which assist materially in absorbing much of the sound and prevents reflection of the same.

It is preferable to have the receptacle built in the shape as shown in Fig. 5, wherein it will be seen that the receptacle 17 is of metal, having sides 18, and a bottom 19, with turned over flanges 20 on the open face. The receptacle or container may be constructed without an upper and a lower side, so that the sound traps, when assembled one upon another, may form one single elongated sound trap, extending from the top to the bottom of the wall, but for convenience of handling and result accomplished, they may be separate units, placed one upon the other. Within each sound trap is suitably secured in proper position a very coarse wire mesh 23, the ends of the same being suitably held in position to the flanges at each end 24 and 25, and also with suitable braces 26 to hold the curve in proper position. The curve of the wire resembles the letter J when laid down. To the wire mesh is secured a sheet of soft but thick fire-proofed pressed felt 27, that assumes every curvature of the wire mesh throughout its length. After the felt is placed in position, the open face of the receptacle is covered with a fine wire mesh 17'. To the intersectional joints of the several sound traps may be secured any desired design moulding 30, as shown in Figs. 6 and 7, giving an artistic and effective panel design along the wall, free from any suspicion of the interior means for pocketing any sounds, yet fireproof in every particular.

Referring particularly to Fig. 2, it will be seen that the main sound wave 31 encounters the soft felt 27 at 32, where it is reflected to the curve 33, at the point 34 where it is further trapped and absorbed till there is little or no wavelets to issue therefrom, thereby lessening any possibility of echoes, which start when the difference between the time of reflection of the direct and reflected sound is approximately one-sixteenth of a second.

The sound trap for this particular zone C is the simplest because it deals only with angles from the greatest at thirty-eight degrees, to the smallest at one degree, although in a majority of theatres and auditoriums the angle will be approximately eighteen and one-half degrees.

While the sound trap to be placed in Zone D, is similar in every way to the sound trap just described, yet the curve herein is different. As will be seen from Fig. 3, the governing angles for this zone are entirely specific. The curves of the felt in this trap are from the greatest at forty-nine degrees, to the smallest at thirty-eight degrees. It will be noted that the direct wave 31 first encounters the absorbing material 27, where it absorbs some of the wave and reflects the same from the point 35 to the curve 33. Here the wave is more or less absorbed at 36 and is again reflected to the upper end of the curve 33 at the point 37, where it is again absorbed and the residue again reflected to a point 38 on the large curve, where it is lost to the extent of interfering with any other subsequent sound issuing from the main point.

Now considering the third and last sound trap, it will be found radically different from the others in that the receptacle is divided into two compartments and each has its wire mesh and felt secured in place as has been previously described. This sound trap, which is located nearest the stage or zone E, is one of the most vital in the treatment of acoustics in the modern theatre. It is in this particular zone where more than half of the serious damage to the sound wave is done. Again it is in this zone that the majority of small wavelets are created and thrown back into the course of the direct waves, thus crossing their paths and distorting them when they come into contact. The major curve of the soft pressed felt is for angles between the greatest at sixty-one and one-half degrees, and the smallest at forty-nine degrees. The felt in both compartments are the exact replica of the other. It will be noted that the sound wave 31 in this zone encounters the absorbing material 27 at 39 when it is again reflected to the curve 33 at a point 40, where some parts of the wave are absorbed, and the other parts again reflected to the point 41, where it is thrown back again on the absorbing material at 42. What part of the sound that escapes from this particular trap is such that it cannot interfere in any way with any subsequent sound. The causing of the sounds to be reflected from one point to another within the trap each time said sound encountering the soft absorbing material causes the same to become weaker and weaker till the wave virtually fades out.

It has always been a great problem of acoustical correction to find a sound-absorbing material that would trap the sounds so that reflections and reverberations could be controlled. From actual experiments, it has been found that soft pressed felt or like material will not only absorb a major portion of the sound, but by my method of forming the felt into practically J shape, it causes the sounds to be reflected and absorbed from one point to another, as described. Figs. 2 to 4 inclusive show at a glance that there is little or nothing left of the sound after entering my sound trap. The most common acoustical defect is excessive reverberation. This condition results when sounds are prolonged by reflection for so long that they overlap sounds created later, giving rise to difficulty in distinguishing the separate sounds. If, as in a typical case, sounds persisted for five seconds and new sounds were being created at the rate of three per second, fifteen separate sounds would be in the air at the same time. As a result, distinctness of sound impression is lost and the listener hears a jumble of noises instead of separate intelligible sounds. My sound trap, in short, is to trap all reflections and echoes, as well as reverberations. When it is considered that if sound waves strike a smooth plaster wall of sufficient rigidity, 99% of the sound is reflected, while with my sound trap, less than 10% emanates from the trap, the effectiveness of the latter is apparent.

It has been found that the reverberation in a given room is practically independent of the place where the vibrating body is situated, or of the position of the hearer; it depends upon the volume of the room, upon the material of the walls and floors, upon the cushions, the audience, etc., and to a certain extent upon the intensity of the sound. The following formula has been developed by Professor Sabin of Harvard University:

$$(a + b_1 x_1 + b_2 x_2 + \text{etc.}) \ t = 0.164 V$$

where "$a$" is a constant, depending upon the absorbing power of the walls of the room, "$b$" is a coefficient of absorption for one square meter of a definite material put anywhere in the room, the standard of comparison being the absorption of one square meter of open window. $x$ is the number of square meters of the material. $F$ is the duration of reverberation. $V$ is the volume of the room in cubic meters.

While this formula is practically the standard formula of today, yet the only amendment that has been suggested and accepted is the one of Dr. W. S. Franklin, who theoretically determines time of reverberation:

$$t = 0. \frac{162 V}{a}$$

While I have herein described the form of my invention as at present preferred and which I consider to represent the best embodiment thereof, yet I desire to have it understood that it is only illustrative and that the invention may be carried out in other ways than that shown and described; for instance, as shown in Fig. 8, the several containers or sound traps 17 may be secured in position, then the fine wire mesh 17' may be put over the open faces of the traps without the addition of the moulding 30, as before referred to, thus affording to the eye an unbroken wall that may be frescoed as is usual, yet such auditorium or hall contains all the essential acoustical features. The traps may be arranged in the ceiling if desired, and the auditorium or hall be made fireproof throughout. All are intended to come within the scope of my claims.

Having thus described the end sought by me, what I claim as new and desire to protect by Letters Patent is:

1. An acoustic trap comprising an open-ended housing, wire-fabric supporting means mounted in said housing, said means being substantially J-shaped in cross-section, and sound-absorbing material supported on said supporting means.

2. An open-ended acoustic box comprising sound-absorbing means, said means being substantially J-shaped in cross-section.

3. A device of the character described comprising a box-like housing, one end of said housing being open, a fine wire gauze covering said open end, supporting means in said housing, and a layer of sound absorbing material on said supporting means, said layer and supporting means being substantially J-shaped in cross-section.

4. Sound-absorbing means comprising a box having an open face, a wire gauze covering for said open face, said covering being adapted to have decorations or the like painted thereon, and a curved layer of sound-absorbent material mounted in said box.

5. Sound-absorbing means particularly adapted for application to auditorium walls comprising a layer of sound-absorbent material, said layer being substantially J-shaped in cross-section, the open end of the curve of the J being disposed toward the source of the sound.

6. An acoustic trap adapted for use in an auditorium or the like comprising a layer of sound-absorbent material, one end of said layer being bent back in spaced relation upon itself toward the source of sound, whereby that portion of sound wave impinging upon said layer which is reflected therefrom will be substantially absorbed by said bent portion or re-reflected to said layer.

7. An auditorium wall comprising, in combination, a plurality of acoustic traps disposed at different distances from the source of sound, said traps each comprising a layer of sound-absorbent material, said layer being bent back upon itself at one end thereof toward the source of sound to form an open-ended curved portion, said curved portion being adapted to absorb sound waves reflected thereonto from said layer and to re-reflect sound waves onto said layer.

8. A plurality of sound-absorbing acoustic traps adapted to cover the wall of an auditorium or the like at different distances from the source of sound, curved sound absorbing material in said traps the effective length of curved absorbing material varying with the angle of incidence of the sound waves, the shorter curved absorbing material being disposed nearest the source of sound and cooperating to absorb the waves of maximum angle of incidence.

9. An acoustic trap comprising a layer of sound-absorbent material mounted therein, said layer being substantially hook-shaped in cross-section, the curved end of said layer being disposed at one side of said trap, and the remainder of said layer extending obliquely forward from said curved end to the other side of the box.

10. The construction defined in claim 9, and a sound-penetrable wire gauze mounted across the front of the box, said gauze being adapted to have painted decorations thereon, substantially as and for the purpose described.

11. The herein described method of dividing an auditorium into a plurality of zones and having a special acoustic box for each zone whereby the sound is trapped and absorbed by a layer of absorbing material specially positioned therein, and means for obscuring the contents of said box.

12. A method of causing sounds of ordinary volume to be rendered free from reflected interferences, which consists of sound traps arranged along the walls of the auditorium, means located therein for catching and absorbing the sounds from any angle, and a covering for said trap that will permit the sound to penetrate therethrough to the absorbing material.

Signed at Glen Cove, in the county of Nassau, and State of New York, this 7th day of May, A. D. 1931.

JOHN CLIFFORD JOHNSON.